(12) United States Patent
Heo et al.

(10) Patent No.: US 10,876,018 B2
(45) Date of Patent: Dec. 29, 2020

(54) HARD COATING COMPOSITION AND WINDOW MEMBER HAVING HARD COATING LAYER

(71) Applicants: Samsung Display Co., Ltd., Yongin-si (KR); SMS, Hwaseong-si (KR)

(72) Inventors: Jinnyoung Heo, Asan-si (KR); Kilsung Lee, Gwacheon-si (KR); Hyemin Seo, Suwon-si (KR); Hoseok Sohn, Seoul (KR); Yongseok Lee, Suwon-si (KR)

(73) Assignees: Samsung Display Co., Ltd., Yongin-si (KR); SMS, Hwaseong-si (KR)

( * ) Notice: Subject to any disclaimer, the term of this patent is extended or adjusted under 35 U.S.C. 154(b) by 125 days.

(21) Appl. No.: 15/836,371

(22) Filed: Dec. 8, 2017

(65) Prior Publication Data

US 2018/0327634 A1 Nov. 15, 2018

(30) Foreign Application Priority Data

May 12, 2017 (KR) .................. 10-2017-0059548

(51) Int. Cl.
| | | |
|---|---|---|
| *C09D 183/04* | (2006.01) | |
| *C08K 5/5415* | (2006.01) | |
| *G06F 1/16* | (2006.01) | |
| *C09D 7/40* | (2018.01) | |
| *C08K 3/34* | (2006.01) | |
| *C09D 7/62* | (2018.01) | |
| *C08K 9/06* | (2006.01) | |
| *C08G 77/20* | (2006.01) | |
| *C08G 77/04* | (2006.01) | |

(52) U.S. Cl.
CPC .............. *C09D 183/04* (2013.01); *C08K 3/34* (2013.01); *C08K 5/5415* (2013.01); *C09D 7/40* (2018.01); *C09D 7/62* (2018.01); *G06F 1/1652* (2013.01); *C08G 77/045* (2013.01); *C08G 77/20* (2013.01); *C08K 9/06* (2013.01)

(58) Field of Classification Search
CPC .......... C09D 183/04; C09D 7/40; C09D 7/62; C08G 77/20; C08G 77/045

USPC ......................................................... 526/279
See application file for complete search history.

(56) References Cited

U.S. PATENT DOCUMENTS

| | | | | |
|---|---|---|---|---|
| 2007/0260008 | A1* | 11/2007 | Saito ......................... | C08K 3/34 524/547 |
| 2010/0029804 | A1* | 2/2010 | Nakayama ......... | C08G 18/3876 522/172 |
| 2014/0178698 | A1* | 6/2014 | Rathore ............... | C09D 183/04 428/447 |
| 2015/0299399 | A1* | 10/2015 | Rathore ................. | C08G 77/20 428/447 |
| 2016/0046830 | A1* | 2/2016 | Kim .................... | C09D 151/085 428/412 |
| 2016/0083526 | A1* | 3/2016 | Hwang ................ | C08G 77/442 522/78 |
| 2016/0145449 | A1* | 5/2016 | Hilgers .................... | C09D 4/06 428/327 |
| 2016/0194451 | A1 | 7/2016 | Yoshida et al. | |
| 2016/0289407 | A1 | 10/2016 | Park et al. | |
| 2016/0333214 | A1* | 11/2016 | Masuda ..................... | C08J 7/08 |
| 2019/0177573 | A1* | 6/2019 | Rathore ............... | C09D 183/06 |

FOREIGN PATENT DOCUMENTS

| | | | |
|---|---|---|---|
| JP | 2013-035274 | * | 2/2013 |
| KR | 10-1514316 B1 | | 4/2015 |
| KR | 10-2015-0100817 A | | 9/2015 |
| KR | 10-2016-0020614 A | | 2/2016 |
| KR | 10-1611935 B1 | | 4/2016 |
| KR | 10-2016-0066917 A | | 6/2016 |
| KR | 10-1671430 B1 | | 11/2016 |
| KR | 10-2017-0040599 A | | 4/2017 |

* cited by examiner

*Primary Examiner* — Margaret G Moore

(74) *Attorney, Agent, or Firm* — Lewis Roca Rothgerber Christie LLP

(57) ABSTRACT

A hard coating composition according to an embodiment includes a polymer derived from a mixture including a silsesquioxane, a siloxane compound, and inorganic particles which are surface treated with silane. A hard coating layer having high surface hardness and impact resistance, and at the same time, excellent bending properties may be provided.

16 Claims, 5 Drawing Sheets

HARD COATING COMPOSITION AND WINDOW MEMBER HAVING HARD COATING LAYER

CROSS-REFERENCE TO RELATED APPLICATION

This patent application claims priority to and the benefit of Korean Patent Application No. 10-2017-0059548, filed on May 12, 2017, the entire content of which is incorporated herein by reference.

BACKGROUND

1. Field

The present disclosure herein relates to a hard coating composition and a window member including a hard coating layer, and more particularly, to a hard coating composition and a window member including a hard coating layer formed utilizing the hard coating composition.

2. Description of the Related Art

Various types of display devices are utilized to provide image information, and such display devices include a display module for displaying images and a window member for protecting the display module. Here, the window member constitutes the outer surface of the display device, and thus is required to provide a tough surface with high surface hardness and impact resistance to ensure reliability after repeated use.

Recently, window members manufactured utilizing a plastic material to be utilized in flexible display devices are being developed. The window members utilized in the flexible display devices are required to have flexibility (to prevent deformation against bending and/or folding), and surface hardness and impact resistance.

SUMMARY

An aspect according to one or more embodiments of the present disclosure is directed toward a hard coating composition for forming a hard coating layer having excellent surface hardness and flexibility.

Another aspect according to one or more embodiments of the present disclosure is directed toward a window member including a hard coating layer having excellent surface hardness and bending properties.

Additional aspects will be set forth in part in the description which follows and, in part, will be apparent from the description, or may be learned by practice of the presented embodiments.

According to an embodiment of the inventive concept, a hard coating composition includes a polymer derived from a mixture including a silsesquioxane, a siloxane compound, and inorganic particles which are surface treated with silane.

In an embodiment, the hard coating composition may include from about 30 wt % to about 60 wt % of the silsesquioxane, from about 10 wt % to about 40 wt % of the siloxane compound, and from about 10 wt % to about 30 wt % of the inorganic particles based on a total amount of the hard coating composition.

In an embodiment, the hard coating composition may further include at least one photoinitiator, and the at least one photoinitiator may be included in an amount of about 1 wt % to about 5 wt % based on a total amount of the hard coating composition.

In an embodiment, the at least one photoinitiator may include a first photoinitiator configured to be activated by first ultraviolet rays, and a second photoinitiator configured to be activated by second ultraviolet rays, the second ultraviolet rays having a longer wavelength than the first ultraviolet rays, and the first photoinitiator and the second photoinitiator may be included in a ratio of 1:0.2 to 0.2:1.

In an embodiment, the silsesquioxane may be a ladder-type silsesquioxane.

In an embodiment, the siloxane compound may have at least one acrylate functional group.

In an embodiment, the inorganic particle may be at least one of $SiO_2$, $TiO_2$, $Al_2O_3$, $ZrO_2$, $ZnO$, $AlN$, or $Si_3N_4$.

In an embodiment, the hard coating composition may further include a polyfunctional acrylate compound.

In an embodiment, the polyfunctional acrylate compound may be included in an amount of about 3 wt % to about 20 wt % based on a total amount of the hard coating composition.

In an embodiment, the polyfunctional acrylate compound may include at least six acrylate functional groups.

In an embodiment, the hard coating composition may further include at least one of a polyfunctional acrylate monomer or a polyfunctional urethane acrylate oligomer.

In an embodiment, the hard coating composition may further include at least one of an antistatic agent or an ultraviolet absorbent.

In an embodiment of the inventive concept, a hard coating composition includes a polymer represented by the following Formula 1:

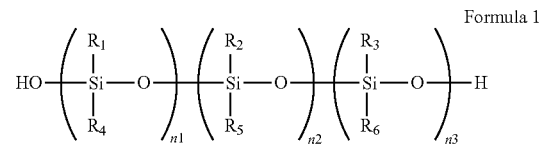

Formula 1

In Formula 1, $R_1$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO\text{---})*$; X is a hydrogen atom, a deuterium atom, a halogen atom, a substituted or unsubstituted alkyl group having 1 to 6 carbon atoms, or a hydroxyl group; M is Si, Al, Ti, Zn, or Zr; and a and b are each independently an integer of 1 to 3.

$R_2$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, or a substituted or unsubstituted silyl group.

$R_3$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or $*\!-\!(CH_2)_P\!-\!Y$; P is an integer of 1 to 6; Y is

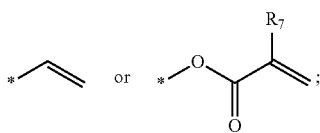

and $R_7$ is hydrogen or methyl.

$R_4$, $R_5$, and $R_6$ are each independently a hydrogen atom, a deuterium atom, a halogen atom, a substituted or unsubstituted alkyl group having 1 to 6 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or an oxygen atom which is connected with an other silicon atom of the polymer represented by Formula 1; and n1, n2, and n3 are each independently an integer of 1 to 100.

In an embodiment, X may be a hydroxyl group, and M may be Si.

In an embodiment, Formula 1 may be represented by the following Formula 1-1:

Formula 1-1

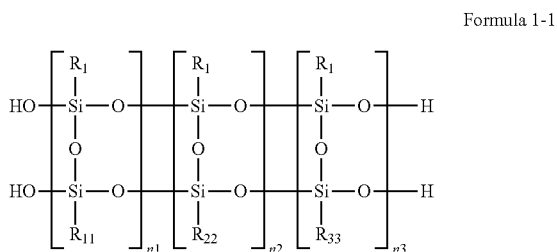

In Formula 1-1, $R_{11}$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, hydroxyl group, or $((X)_b(M)_aO-)*$.

$R_{22}$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, or a substituted or unsubstituted silyl group.

$R_{33}$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or $*\!-\!(CH_2)_P\!-\!Y$. In Formula 1-1, $R_1$, $R_2$, $R_3$, n1, n2, n3, X, M, a, b, Y, and P are the same as defined above.

In an embodiment, the hard coating composition may further include a first photoinitiator configured to be activated by first ultraviolet rays, and a second photoinitiator configured to be activated by second ultraviolet rays, the second ultraviolet rays having a longer wavelength than the first ultraviolet rays.

In an embodiment, the hard coating composition may further include a polyfunctional acrylate compound.

In an embodiment of the inventive concept, a window member includes a plastic substrate, and a hard coating layer on the plastic substrate, and the hard coating layer may be formed utilizing a polymer derived from a mixture including a silsesquioxane, a siloxane compound, and inorganic particles surface treated with silane.

In an embodiment, the plastic substrate may include a first substrate comprising a first polymer resin, and a second substrate including a second polymer resin different from the first polymer resin.

In an embodiment, the hard coating layer may be on an upper surface of the plastic substrate, and a protective coating layer disposed on a bottom surface of the plastic substrate may be further included.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
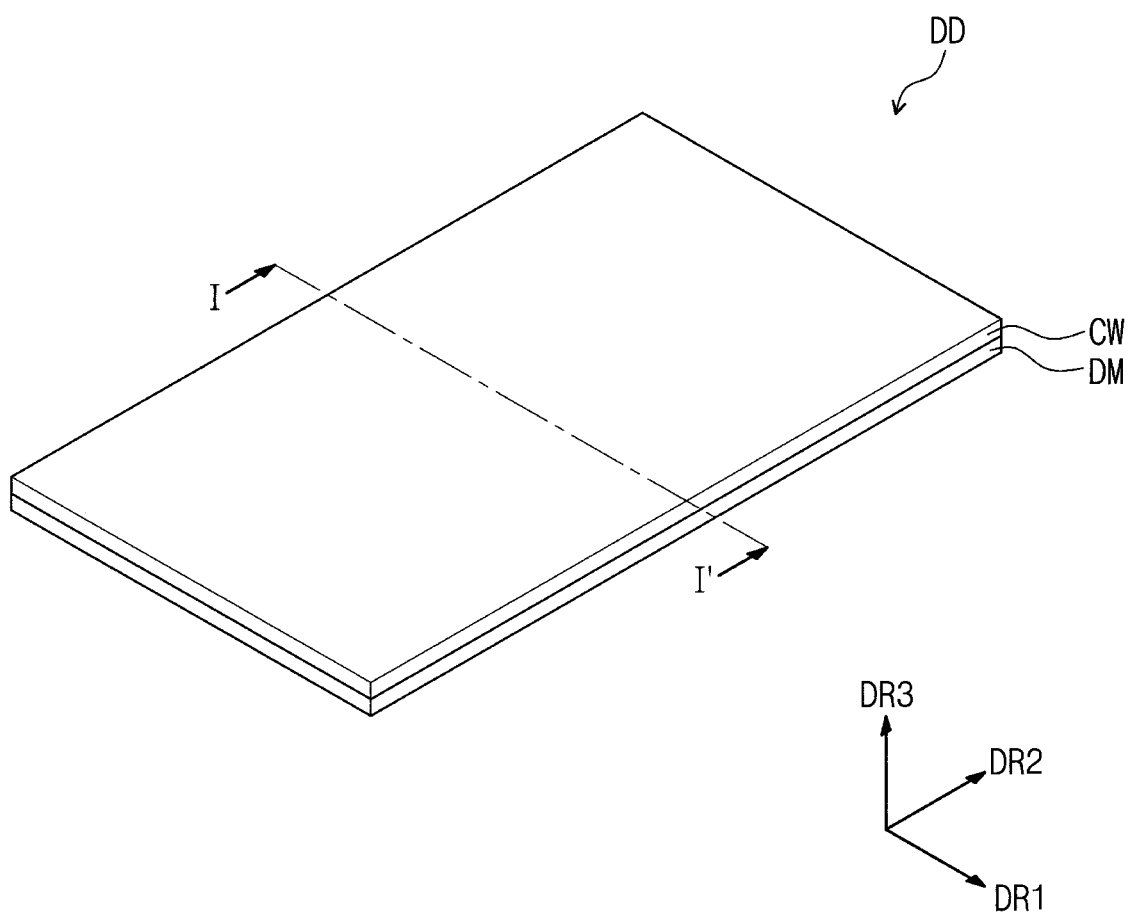
FIG. 1 is a perspective view of a display device including a window member according to an embodiment.

The inventive concept may be embodied in different forms and may have various modifications, and exemplary embodiments of the inventive concept will be described below in more detail with reference to the accompanying drawings. The inventive concept, however, should not be construed as limited to the embodiments set forth herein. Rather, these embodiments should be understood to include modifications, equivalents, or substitutes within the spirit and scope of the inventive concept.

In the drawings, like reference numerals refer to like elements throughout. The dimensions of structures may be exaggerated for clarity of illustration. It will be understood that, although the terms "first," "second," etc. may be used herein to describe various elements, these elements should not be limited by these terms. These terms are only used to distinguish one element from another element. For example, a first element could be termed a second element without departing from the teachings of the present disclosure. Similarly, a second element could be termed a first element. As used herein, the singular forms are intended to include the plural forms as well, unless the context clearly indicates otherwise.

It will be further understood that the terms "comprises" or "comprising," when used in this specification, specify the presence of stated features, numerals, steps, operations, elements, parts, or the combination thereof, but do not preclude the presence or addition of one or more other features, numerals, steps, operations, elements, parts, or the combination thereof.

It will also be understood that when a layer, a film, a region, a plate, etc., is referred to as being "on" or "under" another part, it can be directly on or under the other part, or intervening layers may also be present. In addition, it will also be understood that when a plate is referred to as being disposed above another part, it can be disposed above or beneath another part.

Hereinafter, the hard coating composition and the window member according to exemplary embodiments of the inventive concept will be explained in more detail with reference to the accompanying drawings.

Figure 2:
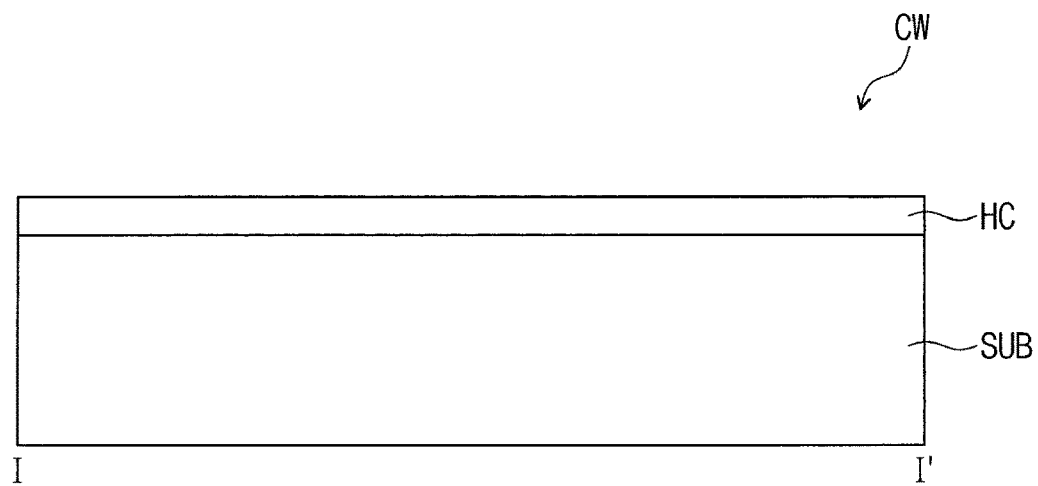
FIG. 2 is a cross-sectional view of a window member taken along the line I-I' in FIG. 1 according to an embodiment.
Figure 2:

FIG. 1 is a perspective view of a display device DD including a window member CW according to an embodiment. FIG. 2 is a cross-sectional view of the window member CW included in the display device DD taken along the line I-I' in FIG. 1 according to an embodiment.

Referring to FIG. 1, a display device DD may include a display module DM and a window member CW disposed on the display module DM. The display module DM may produce images and provide the produced images toward a top surface, which is a third direction DR3 in FIG. 1. The display module DM may be flexible.

The display module DM may include a display panel and one or more functional members. The display panel may be, for example, an organic electroluminescence display panel, a liquid crystal display panel, an electronic ink display panel, an electrowetting display panel, an electrophoretic display panel, or the like. The display panel may be flexible. However, an embodiment of the inventive concept is not limited thereto, and the display panel may be rigid.

The display module DM may include at least one of a protective film, a sensing unit, or an optical member as the functional members. However, an embodiment of the inventive concept is not limited thereto, and the display module DM may further include additional functional members in addition to the suggested members. Each of the functional members may be flexible. The protective film may protect the display panel from external impact. The optical member may include a polarizer, an optical compensating layer, a phase delaying member, and/or the like.

The sensing unit may be, for example, a touch sensing unit, which may include, but is not limited to, an electrostatic capacitor type or electromagnetically inducing type touch sensing unit. The functional members may be disposed on the display panel.

In the display module DM, the display panel and the functional members may be combined via an optical clear adhesive (OCA). However, embodiments of the inventive concept are not limited thereto, and any one of the functional members may be formed directly on an adjacent functional member.

On the display module DM, a window member CW may be disposed. The window member CW may be disposed on the display module DM and play the role of a protection substrate for protecting the display module DM. The window member CW may constitute the top surface of the display device DD and provide the input surface, touch surface and/or display surface for the input of information by a user in the display device DD. The window member CW may be flexible. Even though not shown in the drawing, an optical clear adhesive may be further disposed between the display module DM and the window member CW.

While FIG. 1 illustrates a display device DD having a flat plane (e.g., a flat shape), embodiments of the inventive concept are not limited thereto. For example, the display device DD may include a planar region and at least one curved region.

FIG. 2 illustrates a cross-sectional view of a window member according to an embodiment. The window member CW may include a plastic substrate SUB and a hard coating layer HC disposed on the plastic substrate SUB. The window member CW according to an embodiment will be explained in more detail below, and a hard coating composition forming the hard coating layer HC included in the window member CW according to an embodiment will be explained first.

The hard coating composition according to an embodiment may include a polymer derived from a mixture including a silsesquioxane, a siloxane compound, and inorganic particles which are surface treated with silane. The hard coating composition according to an embodiment may include a polymer unit obtained by reacting a silsesquioxane, a siloxane compound, and inorganic particles which are surface treated with silane.

In an embodiment, the polymer included in the hard coating composition may be derived from a mixture including a silsesquioxane. For example, the hard coating composition may include a siloxane compound, and a silsesquioxane polymer including inorganic particles which are surface treated with silane. For example, the polymer included in the hard coating composition according to an embodiment may be a silsesquioxane polymer in which at least one siloxane group (of the silsesquioxane polymer) is combined (e.g., chemically bonded) with inorganic particles which are surface treated with silane.

The silsesquioxane constituting the mixture forming the polymer may include a repeating unit represented by $[Q^1SiO_{1.5}]$. Here, $Q^1$ may be a hydrogen atom, a deuterium atom, a $C_1$-$C_{10}$ alkyl group, an aryl group having 6 to 30 carbon atoms for forming a ring, or a $C_2$-$C_{20}$ alkenyl group. When the silsesquioxane includes a plurality of the repeating units represented by $[Q^1SiO_{1.5}]$, the plurality of $Q^1$s may be the same or different.

The silsesquioxane utilized in an embodiment may be a ladder-type silsesquioxane. The silsesquioxane may be included in an amount of about 30 wt % to about 60 wt % based on the total amount (i.e., total weight) of the hard coating composition. If the amount of the silsesquioxane is less than about 30 wt %, the flexibility of a hard coating layer formed utilizing the hard coating composition may not be improved. If the amount of the silsesquioxane is greater than about 60 wt %, the surface hardness of a hard coating layer formed utilizing the hard coating composition may be decreased.

The polymer included in the hard coating composition according to an embodiment may be derived from a mixture including a siloxane compound. In an embodiment, the siloxane compound may have at least one acrylate functional group. For example, the siloxane compound may have an acrylate group as a terminal group. For example, the siloxane compound may be a siloxane polymer or a siloxane oligomer having an acrylate group as a terminal group. In an embodiment, the siloxane compound may be provided as a polymer with a silsesquioxane in one body (e.g., may be provided as a copolymer including both the siloxane polymer or oligomer and the silsesquioxane).

The siloxane compound in the polymer included in the hard coating composition according to an embodiment may be included in an amount of about 10 wt % to about 40 wt % based on the total amount of the hard coating composition. If the amount of the siloxane compound is less than about 10 wt %, the surface hardness and strength of the hard coating layer may be deteriorated. If the amount of the siloxane compound is greater than about 40 wt %, the brittleness of the hard coating layer may increase, the flexibility thereof may be deteriorated, and the generation frequency of cracks (i.e., the likelihood of crack formation and the number of cracks formed) in a bending state may increase.

The mixture forming a polymer included in the hard coating composition according to an embodiment may include surface treated inorganic particles. The surface treated inorganic particles may be inorganic particles which are surface treated with silane. In an embodiment, the inorganic particles which are surface treated with silane may be inorganic particles which are surface treated with a silane coupling agent.

In the inorganic particles which are surface treated with silane, the inorganic particles may have a polydispersity distribution obtained by mixing a plurality of particles having substantially a spherical shape and having a size distribution of substantially monodispersion or monodispersity distribution. For example, the average size of the inorganic particles may be from about 10 nm to about 50 nm. The average size of the inorganic particles may represent the average diameter of the inorganic particles. For example, the average diameter of the inorganic particles may be from about 10 nm to about 30 nm.

In an embodiment, if the average size of the inorganic particles is greater than about 50 nm, the optical transparency of a hard coating layer formed utilizing the hard coating composition may be deteriorated. In addition, if the average size of the inorganic particles is less than about 10 nm, the surface hardness improving effect of a hard coating layer may be deteriorated.

The inorganic particles may be $SiO_2$, $TiO_2$, $Al_2O_3$, $ZrO_2$, ZnO, AlN, $Si_3N_4$, or a combination thereof. That is, the inorganic particles may include at least one of $SiO_2$, $TiO_2$, $Al_2O_3$, $ZrO_2$, ZnO, AlN, or $Si_3N_4$. The hard coating composition according to an embodiment may include $SiO_2$ which is surface treated with silane, $TiO_2$ which is surface treated with silane, $Al_2O_3$ which is surface treated with silane, $ZrO_2$ which is surface treated with silane, ZnO which is surface treated with silane, AlN which is surface treated with silane, $Si_3N_4$ which is surface treated with silane, or a mixture thereof.

The inorganic particles which are surface treated with silane have improved compatibility with a silsesquioxane or a siloxane compound due to the surface modification, and the amount of the inorganic particles (that can be incorporated) in the hard coating composition may be increased. Accordingly, the hard coating composition according to an embodiment may form a hard coating layer having increased surface hardness and strength by including the inorganic particles which are surface treated with silane and by increasing the ratio (e.g., the amount) of the inorganic particles.

The hard coating composition according to an embodiment may include the inorganic particles which are surface treated with silane in an amount of about 10 wt % to about 30 wt % based on the total amount of the hard coating composition. If the amount of the inorganic particles is less than about 10 wt %, the surface hardness and strength of the hard coating layer may be decreased, and if the amount of the inorganic particles is greater than about 30 wt %, the compatibility of the inorganic particles in the hard coating composition may be decreased.

In the hard coating composition according to an embodiment, the inorganic particles which are surface treated with silane may be bonded to a silsesquioxane to provide a polymer in which they are formed in one body (e.g., the inorganic particles and the silsesquioxane are chemically bonded together).

That is, the hard coating composition according to an embodiment may include a polymer which is formed in one body via the reaction of a mixture of a silsesquioxane, a siloxane compound, and inorganic particles which are surface treated with silane.

The hard coating composition according to an embodiment may include a polymer represented by Formula 1 below.

[Formula 1]

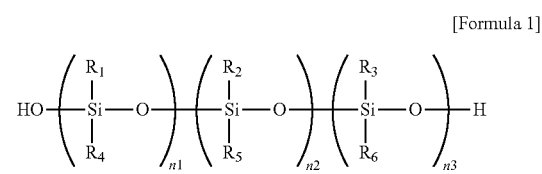

In Formula 1, $R_1$ may be a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO)$ *.

In Formula 1, $R_2$ may be a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, or a substituted or unsubstituted silyl group.

In addition, $R_3$ may be a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or *—(CH$_2$)$_P$—Y.

In Formula 1, $R_4$, $R_5$, and $R_6$ may be each independently a hydrogen atom, a deuterium atom, a halogen atom, a substituted or unsubstituted alkyl group having 1 to 6 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or an oxygen atom which is connected with another silicon atom of the polymer represented by Formula 1.

Also, in Formula 1, n1, n2, and n3 may be each independently an integer of 1 to 100.

Throughout the present disclosure, the term a "substituted or unsubstituted" functional group may refer to an unsubstituted functional group, or a functional group where one or more of its hydrogen atoms are substituted with at least one substituent selected from deuterium, halogen, cyano, nitrile, nitro, amino, silyl, boron, phosphine oxide, alkyl, alkenyl, fluorenyl, aryl, and heterocyclic groups. In addition, each of the substituents illustrated above may be further substituted or remain unsubstituted. For example, a biphenyl group may be interpreted as an aryl group, or a phenyl group substituted with a phenyl group.

In the present disclosure, examples of a halogen atom may include a fluorine atom, a chlorine atom, a bromine atom, or an iodine atom. In addition, the alkyl group may have a linear, branched or cyclic shape. The aryl group refers to a functional group or substituent derived from an aromatic hydrocarbon ring, and the aryl group may be monocyclic aryl or polycyclic aryl. In addition, the heterocyclic group may be a heteroaryl group including at least one of O, N, P, Si, or S as a heteroatom in forming the ring. In the present disclosure, the alkenyl group may be linear or branched. In addition, in the present disclosure, —* represents a connecting site.

Formula 1 may represent a polymer derived from a mixture including a silsesquioxane, a siloxane compound, and inorganic particles which are surface treated with silane.

In Formula 1, $R_1$ may be $((X)_b(M)_aO$—$)$*, and in $((X)_b(M)_aO$—$)$*, X may be a hydrogen atom, a deuterium atom, a halogen atom, a substituted or unsubstituted alkyl group having 1 to 6 carbon atoms, or a hydroxyl group. M may be Si, Al, Ti, Zn, or Zr, and a and b may be each independently an integer of 1 to 3.

n1 may be an integer of 1 to 100, and when n1 is an integer of 2 or more, a plurality of $R_1$s may be the same or different. In addition, when n1 is an integer of 2 or more, at least one of a plurality of $R_1$s may be $((X)_b(M)_aO$—$)$*. Further, when n1 is an integer of 2 or more, a plurality of $R_4$s may be the same or different.

For example, X may be a hydroxyl group, and M may be Si. However, an embodiment of the inventive concept is not limited thereto.

In Formula 1, $R_3$ may be *—(CH$_2$)$_P$—Y. In *—(CH$_2$)$_P$—Y may be

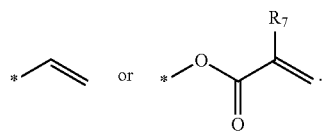

In $R_3$, P may be an integer of 1 to 6. In addition, $R_7$ may be a hydrogen atom or a methyl group.

n3 may be an integer of 1 to 100, and when n3 is an integer of 2 or more, a plurality of $R_3$s may be the same or different. In addition, when n3 is an integer of 2 or more, at least one of a plurality of $R_3$s may be *—(CH$_2$)$_P$—Y. However, an embodiment of the inventive concept is not limited thereto. Further, when n3 is an integer of 2 or more, a plurality of $R_6$s may be the same or different.

n2 may be an integer of 1 to 100, and when n2 is an integer of 2 or more, a plurality of $R_e$s may be the same or different, and a plurality of $R_5$s may be the same or different.

The polymer of Formula 1 may be represented by Formula 1-1 below. Here, the hard coating composition according to an embodiment may include a polymer represented by Formula 1-1 below.

Formula 1-1

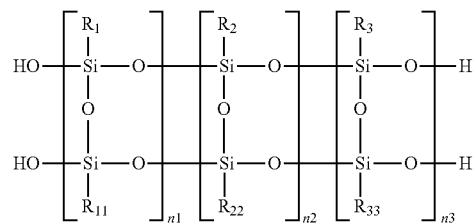

In Formula 1-1, the definition on each of $R_1$, $R_2$, $R_3$, n1, n2, and n3 is substantially the same as in Formula 1. In addition, the definition of $R_{11}$ is substantially the same as that of $R_1$, the definition of $R_{22}$ is substantially the same as that of $R_2$, and the definition of $R_{33}$ is substantially the same as that of $R_3$.

That is, $R_{11}$ may be a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO$—$)$*.

$R_{22}$ may be a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, or a substituted or unsubstituted silyl group.

In addition, $R_{33}$ may be a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or *—(CH$_2$)$_P$—Y.

$R_1$ and $R_{11}$ may be the same or different, and $R_2$ and $R_{22}$ may be the same or different, and $R_3$ and $R_{33}$ may be the same or different.

Formula 1-1 may be Formula 1 where $R_4$, $R_5$, and $R_6$ are oxygen atoms connected with other silicon atoms of the polymer. In Formula 1-1, $R_4$, $R_5$, and $R_6$ are oxygen atoms connected with other silicon atoms of the polymer, but an embodiment of the inventive concept is not limited thereto. For example, in Formula 1, any one of $R_4$, $R_5$, and $R_6$ may be an oxygen atom connected with another silicon atom of the polymer, or two selected from $R_4$, $R_5$, and $R_6$ may be oxygen atoms connected with other silicon atoms of the polymer.

The hard coating composition according to an embodiment may include a polymer derived from a mixture including a silsesquioxane, a siloxane compound, and inorganic particles which are surface treated with silane. In addition, the hard coating composition according to an embodiment may include a polymer represented by Formula 1.

The hard coating composition according to an embodiment may further include at least one photoinitiator. The at least one photoinitiator may include a first photoinitiator which is activated by first ultraviolet rays and a second photoinitiator which is activated by second ultraviolet rays. The central wavelength of the second ultraviolet rays may be longer than the central wavelength of the first ultraviolet rays. For example, the first ultraviolet rays may be light in a ultraviolet wavelength region of which the central wavelength is about 345 nm, and the second ultraviolet rays may be light in a ultraviolet wavelength region of which the central wavelength is about 365 nm.

The hard coating composition according to an embodiment may include the first photoinitiator and the second photoinitiator in a ratio of 1:0.2 to 0.2:1. For example, the first photoinitiator and the second photoinitiator may be included in the hard coating composition according to an embodiment in a ratio of 1:1.

Also, the hard coating composition according to an embodiment may include at least one photoinitiator in an amount of about 1 wt % to about 5 wt % based on the total amount (i.e., total weight) of the hard coating composition. That is, the sum of the amount of the first photoinitiator and the amount of the second photoinitiator may be from about 1 wt % to about 5 wt % based on the total amount of the hard coating composition. For example, the sum of the first photoinitiator and the second photoinitiator may be from about 1 wt % to about 3 wt % based on the total amount of the hard coating composition. For example, the first photoinitiator may be included in an amount of about 1 wt % to about 1.5 wt % based on the total amount of the hard coating composition, and the second photoinitiator may be included in an amount of about 1 wt % to about 1.5 wt % based on the total amount (i.e., total amount) of the hard coating composition. The first photoinitiator and the second photoinitiator may be included in the hard coating composition according to an embodiment in the same amount. For example, each of the first photoinitiator and the second photoinitiator may be included in an amount of about 1 wt %, respectively, based on the total amount of the hard coating composition.

The first photoinitiator may be any one selected from α-hydroxy ketone, 2,2-dimethoxy-1,2-diphenylethan-1-one, 1-hydroxy-cyclohexyl-phenyl-ketone, 2-hydroxy-2-methyl-1-phenyl-1-propanone, 2-hydroxyl-1-[4-(2-hydroxyethoxy)phenyl]-2-methyl-1-propanone, or 2-hydroxy-1-{4-[4-(2-hydroxy-2-methyl-1-propionyl)-benzyl]-phenyl}-2-methylpropan-1-one.

The second photoinitiator may be any one selected from phenylglyoxylate, 2-methyl-1[4-(methylthio)phenyl]-2-morpholinopropan-1-one), 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, or Bis(2,4-cyclopentadienyl)bis[2,6-difluoro-3-(1-pyrryl)phenyl] titanium(IV).

For example, the hard coating composition according to an embodiment may include α-hydroxy ketone as the first photoinitiator and phenylglyoxylate as the second photoinitiator. In one embodiment, the hard coating composition may include from about 1.0 wt % to about 1.5 wt % of α-hydroxy ketone and from about 1.0 wt % to about 1.5 wt % of phenylglyoxylate.

The first photoinitiator is an initiator which is activated by ultraviolet rays with relatively short wavelengths and may increase the hardness at the surface of a hard coating layer formed by the hard coating composition according to an embodiment. In addition, the second photoinitiator is an initiator which is activated by ultraviolet rays with relatively middle wavelengths or long wavelengths and may increase the hardness in a deeper part (e.g., inner portion or the inside) as well as the surface of the hard coating layer.

Figure 3:
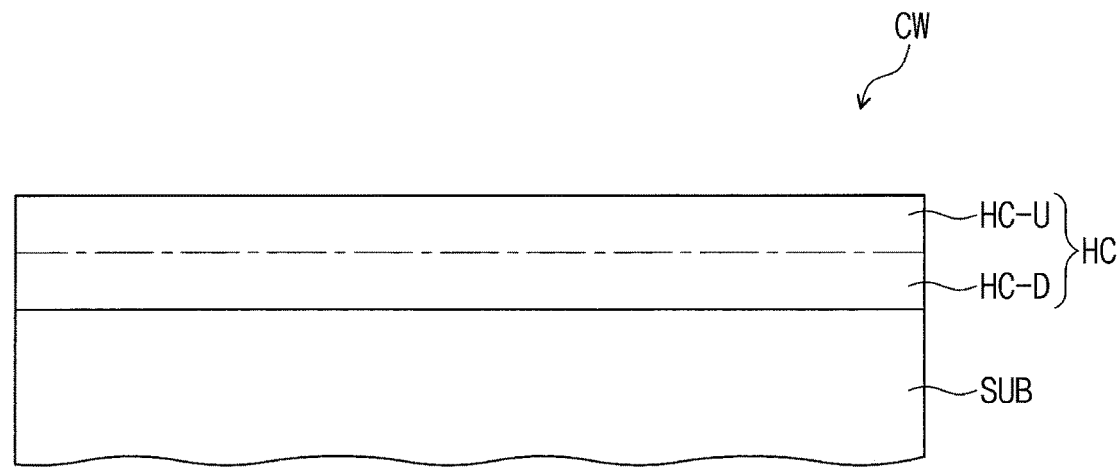
FIG. 3 is a cross-sectional view schematically illustrating a portion of a window member according to an embodiment.
Figure 3:
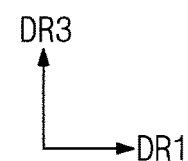

FIG. 3 illustrates a portion of a window member CW including a hard coating layer HC formed utilizing the hard coating composition according to an embodiment. In FIG. 3, an upper hard coating layer HC-U exposed to the outside may be a portion in which polymerization reaction and photo curing are mainly performed by (e.g., initiated by) the first photoinitiator. In addition, a lower hard coating layer HC-D which is adjacent to a plastic substrate SUB, may be a portion in which polymerization reaction and photo curing are performed by (e.g., initiated by) the second photoinitiator in addition to the first photoinitiator.

For example, the first photoinitiator may increase the hardness in a thickness range of about 10 μm or less from the surface of the hard coating layer, and the second photoinitiator may increase the hardness in a thickness range of about 30 μm or less from the surface of the hard coating layer, which is exposed to the outside. Accordingly, by increasing the hardness of the hard coating layer (formed utilizing the hard coating composition according to an embodiment by utilizing both the first photoinitiator and the second photoinitiator, which are activated by ultraviolet rays in different wavelength regions from each other), physical properties such as the strength and durability of the hard coating layer may be improved.

In one embodiment, the hard coating composition may include a plurality of, for example, at least three photoinitiators. Here, the wavelength regions of ultraviolet rays for activating the plurality of photoinitiators may be overlapped or different from one another.

The hard coating composition according to an embodiment may further include a polyfunctional acrylate compound. The hard coating composition according to an embodiment may include a polyfunctional acrylate monomer. In addition, the hard coating composition according to an embodiment may include a polyfunctional urethane acrylate oligomer. The polyfunctional acrylate compound may be bonded to a silsesquioxane polymer via crosslinking reaction utilizing an acrylate reacting group.

The polyfunctional acrylate monomer included in the hard coating composition according to an embodiment may contain six or more acrylate groups in one repeating unit. For example, the hard coating composition according to an embodiment may include at least one of an acrylate monomer having six functional groups, an acrylate monomer having nine functional groups, or an acrylate monomer having fifteen functional groups. However, an embodiment of the inventive concept is not limited thereto.

In addition, the polyfunctional urethane acrylate oligomer included in the hard coating composition according to an embodiment may contain six or more acrylate groups in one repeating unit. For example, the hard coating composition according to an embodiment may include at least one of a urethane acrylate oligomer having six functional groups, or a urethane acrylate oligomer having ten functional groups. However, an embodiment of the inventive concept is not limited thereto.

The hard coating composition according to an embodiment may include from about 3 wt % to about 20 wt % of a polyfunctional acrylate compound based on the total amount of the hard coating composition. The hard coating composition according to an embodiment may include both a polyfunctional acrylate monomer and a polyfunctional urethane acrylate oligomer.

The hard coating composition according to an embodiment may further include an ultraviolet absorbent. The hard coating composition according to an embodiment may further include an ultraviolet absorbent which absorbs light in an ultraviolet wavelength region, and the reliability of a hard coating layer may be improved.

For example, the hard coating composition according to an embodiment may include a benzotriazole-based absorbent, a benzophenone-based absorbent, a salicylic acid-based absorbent, a salicylate-based absorbent, a cyanoacrylate-based absorbent, a cinnamate-based absorbent, an oxanilide-based absorbent, a polystyrene-based absorbent, a polyferrocenylsilane-based absorbent, a methine-based absorbent, an azomethine-based absorbent, a triazine-based absorbent, a para-aminobenzoic acid-based absorbent, a cinnamic acid-based absorbent, a urocanic acid-based ultraviolet absorbent, or a combination thereof.

The hard coating composition according to an embodiment may include an ultraviolet absorbent represented by Formula 2-1 or Formula 2-2 below.

Formula 2-1

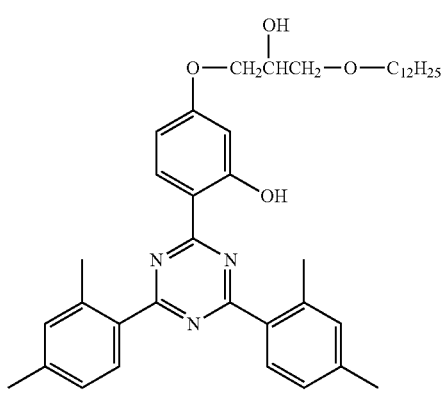

Formula 2-2

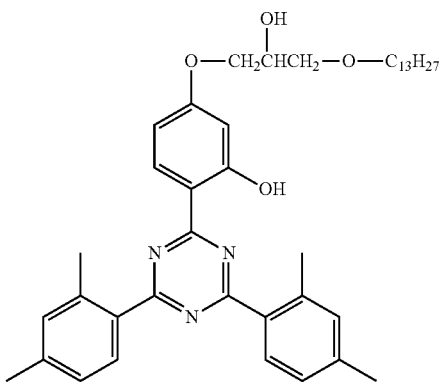

Figure 4:
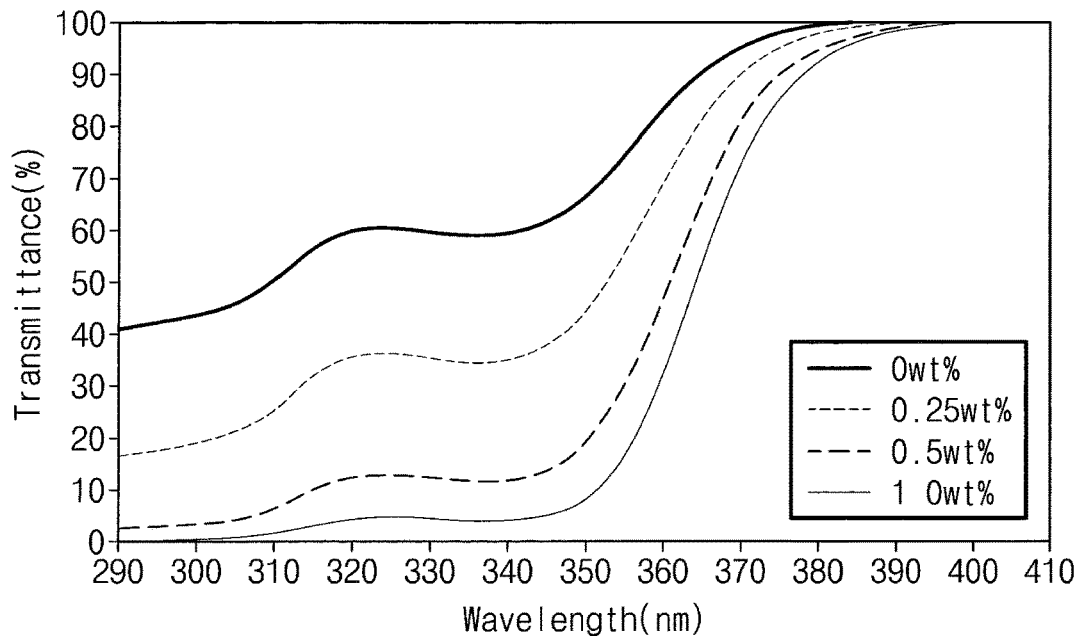
FIG. 4 is a plot showing the transmittance of hard coating layers with different amount of the ultraviolet absorbent as a function of the wavelength.

The hard coating composition according to an embodiment may further include the ultraviolet absorbent and may form a hard coating layer which blocks light in an ultraviolet wavelength region. FIG. 4 is a graph illustrating the optical properties of a hard coating layer formed utilizing a hard coating composition including an ultraviolet absorbent according to an embodiment.

In particular, FIG. 4 shows the optical transmittance of hard coating layers with different amount of the ultraviolet absorbent as a function of the wavelength. In FIG. 4, the results of transmittance in accordance with wavelength are shown for a case when the amount of the ultraviolet absorbent is about 0 wt %, i.e., not include, and cases when the amount of the ultraviolet absorbent is about 0.25 wt %, about 0.5 wt %, or about 1.0 wt % respectively based on the total amount of the hard coating composition.

Referring to the results of FIG. 4, it can be observed that the light transmittance in an ultraviolet wavelength region of about 380 nm or less decreases with the increase of the amount of the ultraviolet absorbent. Accordingly, the ultraviolet blocking effect of the hard coating layer is increased with the increase of the amount of the ultraviolet absorbent.

According to an embodiment, the hard coating composition may form a hard coating layer having ultraviolet blocking effect by further including an ultraviolet absorbent, and ultraviolet rays transmitted to a display module may be blocked, thereby improving the reliability of a display device. The hard coating composition according to an embodiment may include about 0.5 wt % or less of the ultraviolet absorbent based on the total amount of the hard coating composition. For example, the hard coating composition may include the ultraviolet absorbent in an amount of about 0.2 wt % to about 0.5 wt % based on the total amount of the hard coating composition.

The hard coating composition according to an embodiment may further include an antistatic agent. The hard coating composition according to an embodiment may further include an anionic surfactant-based antistatic agent. Since the hard coating composition according to an embodiment further includes an antistatic agent and improves the antistatic properties of the hard coating layer, antipollution (e.g., contamination resistance) function due to reduction in the absorbent of dust, or the like may be improved.

The hard coating composition according to an embodiment may further include a leveling agent. For example, the hard coating composition according to an embodiment may include at least one of a silicone-based leveling agent, a fluorine-based leveling agent, or an acryl-based leveling agent. The hard coating composition according to an embodiment may further include a leveling agent to improve the coatability of the hard coating composition, thereby improving the surface smoothness of a hard coating layer formed utilizing the hard coating composition. The hard coating composition according to an embodiment may include a leveling agent in an amount of about 0.1 wt % or less based on the total weight of the hard coating composition. In one embodiment, the hard coating composition may include a polyether modified polydimethylsiloxane-based leveling agent as a silicone-based leveling agent.

In one embodiment, common solvents known as suitable solvents of a composition for forming a coating layer may be utilized as the solvents of the hard coating composition, without limitation. For example, the hard coating composition may include propylene glycol methyl ether and propylene glycol methyl ether acetate. However, an embodiment of the inventive concept is not limited thereto, and a mixture solvent including at least one of methanol, methyl ethyl ketone (MEK), or isopropyl alcohol may be utilized.

In addition, in the hard coating composition according to an embodiment, additives commonly utilized in a corresponding field may be further included as long as the effect of the hard coating composition of the inventive concept is not deteriorated in addition to the above-described additives. For example, the hard coating composition according to an embodiment may further include additives such as a surfactant, and/or an antioxidant.

The hard coating composition according to an embodiment may be provided as a material of a hard coating layer in a display device. The hard coating layer formed utilizing the hard coating composition according to an embodiment has excellent surface hardness and high flexibility, and may be provided as a material for a hard coating layer of a flexible display device. For example, the hard coating composition according to an embodiment may be provided directly at the outer zone of a display surface (e.g., the top surface) of a display device such as LCD or OLED to form a hard coating layer, or may be provided as a material of a hard coating layer included in a window member provided at the outer zone (e.g., the top surface) of a display device.

According to an embodiment, a window member includes a plastic substrate and a hard coating layer disposed on the plastic substrate. Hereinafter, additional explanation on FIGS. 2 to 5 and explanation on a window member according to an embodiment will be provided.

Referring to FIGS. 2 to 5, window members CW and CW-1 according to exemplary embodiments include a plastic substrate SUB. The plastic substrate SUB may be formed utilizing a polymer material. For example, the plastic substrate SUB may be formed utilizing polyimide, polyacrylate, polymethylmethacrylate (PMMA), polycarbonate (PC), polyethylenenaphthalate (PEN), polyvinylidene chloride (PVC), polyvinylidene difluoride (PVDF), polystyrene (PS), ethylene vinylalcohol (EVA) copolymer, or a combination thereof. However, the material of the plastic substrate utilized in an embodiment is not limited to these polymer materials, and any materials having a suitable optical transparency for providing images provided from a display module of a display device to a user may be utilized, without limitation.

For example, the window member CW according to an embodiment may utilize polycarbonate as the plastic substrate SUB. A polycarbonate substrate may have excellent transparency and high strength and surface hardness.

The thickness of the plastic substrate SUB may be about 50 μm or more. For example, the thickness of the plastic substrate SUB may be from about 50 μm to about 1,000 μm.

Figure 5:
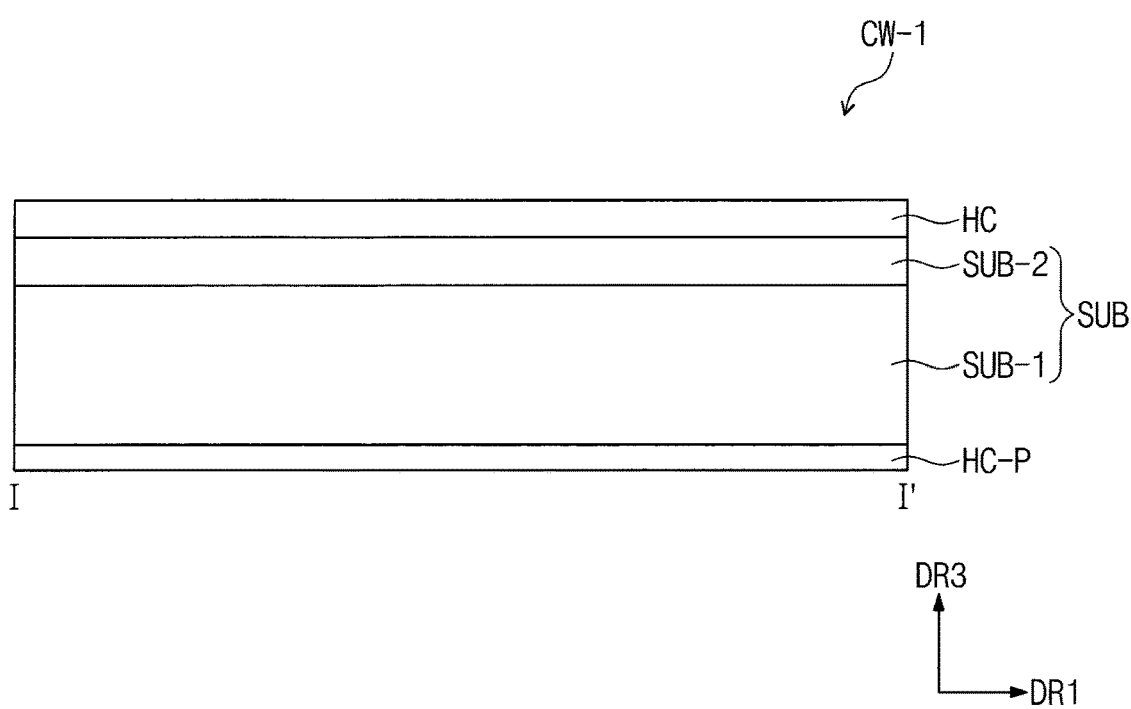
FIG. 5 is a cross-sectional view of a window member taken along the line I-I' in FIG. 1 according to an embodiment.

In addition, as shown in FIG. 5, the window member CW-1 according to an embodiment may include a plastic substrate SUB including a plurality of substrates SUB-1 and SUB-2 laminated together (e.g., laminated one by one). In the plastic substrate SUB including the plurality of laminated substrates SUB-1 and SUB-2, the first substrate SUB-1 and the second substrate SUB-2 may be formed utilizing different polymer materials from each other. For example, the first substrate SUB-1 may be a polycarbonate substrate, and the second substrate SUB-2 may be a polymethylmethacrylate substrate.

The first substrate SUB-1 and the second substrate SUB-2 may have different thickness from each other. For example, the thickness of the first substrate SUB-1 may be greater than the thickness of the second substrate SUB-2.

In one embodiment, the first substrate SUB-1 may be a polycarbonate substrate having a thickness of about 950 μm, and the second substrate SUB-2 may be a polymethylmethacrylate substrate having a thickness of about 50 μm. However, an embodiment of the inventive concept is not limited thereto. In one embodiment, in the plastic substrate SUB including a plurality of laminated substrates, at least three substrates may be laminated, and here, at least two substrates may be formed utilizing different polymer materials.

Also, in the plastic substrate SUB including a plurality of laminated substrates, the plurality of the substrates may have the same or different thickness from each other.

In FIGS. 2 to 5, the window members CW and CW-1 of exemplary embodiments may include a hard coating layer HC disposed on the plastic substrate SUB, and the hard coating layer HC may be formed utilizing the above-described hard coating composition according to an embodiment.

The hard coating layer HC may be formed utilizing a hard coating composition including a polymer derived from a mixture including a silsesquioxane, a siloxane compound, and inorganic particles which are surface treated with silane. In addition, the hard coating layer HC may be formed utilizing a hard coating composition including a polymer represented by Formula 1.

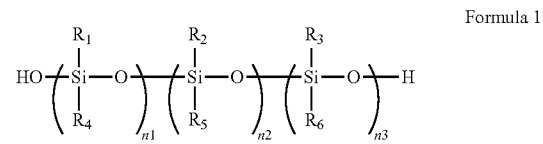

Formula 1

The hard coating composition may be the same as described above for forming the hard coating layer HC. In addition, Formula 1 may be the same as described above.

For example, the window members CW and CW-1 of exemplary embodiments may include a hard coating layer HC formed utilizing a hard coating composition according to an embodiment including a polymer derived from a mixture containing a silsesquioxane, a siloxane compound, inorganic particles which are surface treated with silane, at least one photoinitiator, and a polyfunctional acrylate compound. In addition, the window members CW and CW-1 of exemplary embodiments may include a hard coating layer HC formed utilizing a hard coating composition according to an embodiment including a polymer represented by Formula 1, at least one photoinitiator, and a polyfunctional acrylate compound.

The hard coating layer HC of the window member CW and CW-1 of exemplary embodiments may be formed utilizing the hard coating composition according to an embodiment and may show high surface hardness and flexibility. In addition, since a plastic substrate SUB is utilized as a base, the window members CW and CW-1 each as a whole may show flexible properties.

Referring to FIG. 5, the window member CW-1 according to an embodiment may further include a protective coating layer HC-P on one side of the plastic substrate SUB on which a hard coating layer HC is not provided. That is, the window member CW-1 according to an embodiment may include a hard coating layer HC disposed on the upper surface of the plastic substrate SUB and a protective coating layer HC-P disposed on the bottom surface of the plastic substrate SUB.

The protective coating layer HC-P may be formed utilizing substantially the same hard coating composition as that for the hard coating layer HC. Alternatively, the protective coating layer HC-P may be formed utilizing an acryl compound, a siloxane compound, or a combination thereof. The protective coating layer HC-P may play the role of a protection layer for protecting the plastic substrate SUB. In addition, the protective coating layer HC-P may play the role of a primer for the ease of laminating the window member CW-1 on a display module DM (FIG. 1).

The hard coating layer HC formed utilizing the hard coating composition according to an embodiment may have high surface hardness. For example, the hard coating layer HC may have a pencil hardness value of 6H or more.

In addition, the hard coating layer HC formed utilizing the hard coating composition according to an embodiment may have high flexibility. For example, the hard coating layer HC may have excellent bending properties and no cracks are generated even utilizing a rod having a diameter of about 60 mm or less in a bending test.

The window member according to an embodiment includes a hard coating layer formed utilizing the hard coating composition according to an embodiment, and maintains high surface hardness and flexibility at the same time, and thus, may be utilized as a window of a flexible display device.

Figure 6:
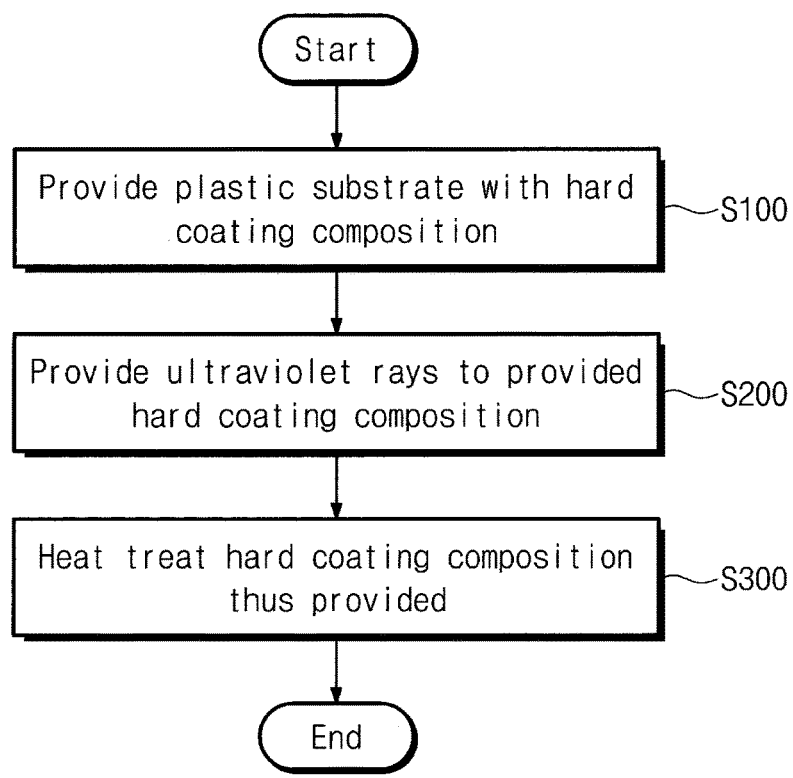
FIG. 6 is a flowchart showing a method of preparing a window member according to an embodiment.

FIG. 6 is a flowchart showing a method of preparing a window member according to an embodiment. Referring to FIG. 6, the method of preparing a window member may include an act of providing a plastic substrate with a hard coating composition (S100), an act of exposing the provided hard coating composition to ultraviolet rays (S200), and an act of heat treating the provided hard coating composition.

The act of providing the plastic substrate with the hard coating composition (S100) may be an act of coating the plastic substrate with the hard coating composition according to an embodiment. The coating method of the hard coating composition is not specifically limited, and commonly known various suitable coating methods may be utilized. For example, various suitable methods such as spin coating, dip coating, spray coating, slit coating, and/or roll to roll coating may be utilized, and an embodiment of the inventive concept is not limited thereto.

The act of exposing the hard coating composition thus provided to ultraviolet rays (S200) may be an act of forming a hard coating layer via polymerization and curing reaction by supplying ultraviolet rays to the hard coating composition provided on the plastic substrate. The hard coating composition according to an embodiment includes at least one photoinitiator and may form a hard coating layer via polymerization and curing reaction utilizing ultraviolet rays.

The act of heat treating of the hard coating composition thus provided (S300) may be an act of forming a hard coating layer by curing the hard coating composition in high temperature conditions.

Here, the method of forming a hard coating layer in the preparation method of a window member according to an embodiment may utilize both a curing method utilizing ultraviolet rays and a curing method utilizing heat treatment at a high temperature. For example, the act of exposing the hard coating composition thus provided to ultraviolet rays (S200) and the act of heat treating the hard coating composition thus provided (S300) may be conducted one by one (e.g., sequentially).

Alternatively, the act of exposing the provided hard coating composition thus provided to ultraviolet rays (S200) and the act of heat treating the hard coating composition thus provided (S300) may be conducted simultaneously or concurrently.

While not shown in FIG. 6, an act of pre-heat treating the hard coating composition prior to the act of exposing the hard coating composition thus provided to ultraviolet rays (S200) may be further included. The act of pre-heat treating may be an act of drying solvents included in the hard coating composition.

Figure 7:
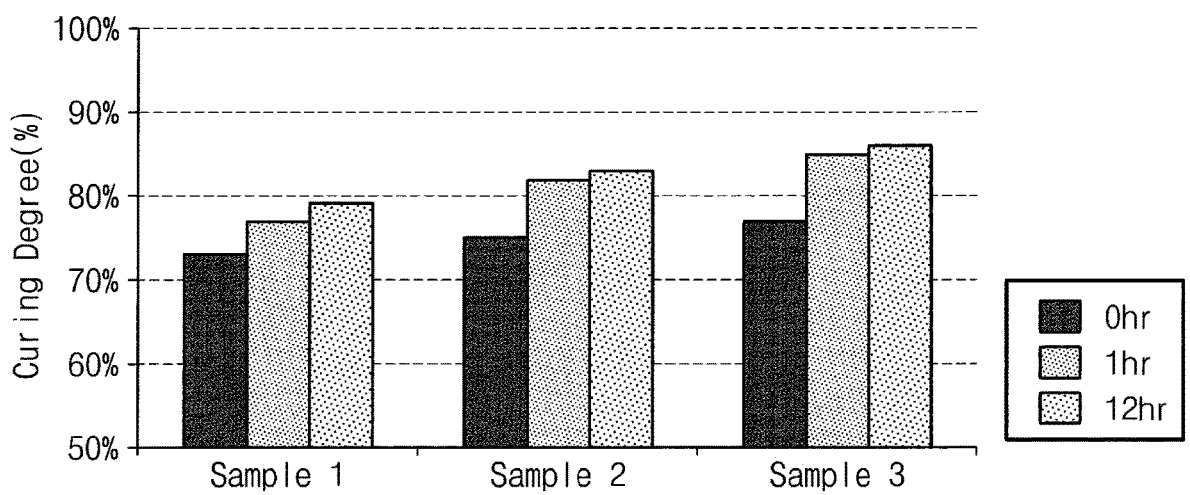
FIG. 7 illustrates the crosslinking degree of a hard coating layer in accordance with the change of a crosslinking process.

FIG. 7 illustrates the change of curing degree of a hard coating layer according to the curing method of a hard coating composition. In FIG. 7, Sample 1 corresponds to a case when ultraviolet rays of about 500 mJ is supplied to the hard coating composition, Sample 2 corresponds to a case when ultraviolet rays of about 500 mJ is supplied twice, and Sample 3 corresponds to a case when ultraviolet rays of about 900 mJ is supplied. In addition, FIG. 7 shows evaluation results on the curing degree by changing the heat treating time at a high temperature of about 85° C. for each sample to 0 hour (i.e., no heat treating at about 85° C.), 1 hour, and 12 hours respectively.

Referring to FIG. 7, it can be observed that the curing degree of the hard coating layer is increased with the increase of the intensity of irradiating ultraviolet rays and the heat treating time. That is, by utilizing both ultraviolet curing and thermal curing to increase the curing degree of the hard coating layer (formed utilizing the hard coating composition), the surface hardness and intensity (e.g., impact resistance) of the hard coating layer may be increased.

The hard coating composition according to an embodiment includes a polymer derived from a mixture containing a silsesquioxane, a siloxane compound, and inorganic particles which are surface treated with silane, and a hard coating layer having excellent hardness and impact resistance, and high flexibility may be provided.

In addition, the window member according to an embodiment includes a hard coating layer formed utilizing a polymer derived from a mixture including all of the silsesquioxane, the siloxane compound, and the inorganic particles which are surface treated with silane, and high impact resistance and excellent bending properties may be attained.

EXAMPLES

Hereinafter, a method of preparing a hard coating composition according to an embodiment and the properties of a window member including a hard coating layer formed utilizing the same will be explained in more detail. However, the method of preparing a hard coating composition which is explained in the example and the window member formed utilizing the same are only provided for the purpose of illustrations, and they do not limit the scope of exemplary embodiments.

<Preparation of Hard Coating Composition>

1. Method of Preparing Silica

To a 2,000 ml round bottom flask, 100 g of tetraethoxysilane, 10 g of water, and 1,000 ml of dimethylsulfoxide were injected and a magnetic bar was added thereto, followed by stirring. 44 g of tetramethylammonium hydroxide was dissolved in 400 ml of ethanol and added to the 2,000 ml round bottom flask dropwise for about 1 hour while stirring. Then, the temperature was elevated to about 40° C. and the reactants were stirred for 1 hour. After finishing the reaction, 200 ml of the reaction product and 700 ml of acetone were mixed in a shaker for about 10 minutes and centrifugation was conducted utilizing a centrifuge at about 18° C. and about 10,000 rpm for about 10 minutes. 50 g of the solid thus obtained was dissolved in ethanol to obtain a silica solution having an average particle diameter of about 15 nm.

2. Method of Preparing Polymer Included in Hard Coating Composition 100 g of a silica solution obtained by the preparation method of silica, 30 g of polymethylsilsesquioxane (Gelest Co., Ltd.), 300 ml of dimethyl sulfoxide, 50 g of triethoxymethylsilane, 3 g of water, and 28 g of pentaerythritol triacrylate were added to a 1,000 ml round bottom flask together with a magnetic bar, and the temperature was elevated to about 60° C., followed by stirring. 22 g of tetramethylammonium hydroxide was dissolved in 200 ml of ethanol and added to the 1,000 ml round bottom flask dropwise for about 1 hour while stirring, followed by additionally stirring for about 1 hour. The reaction product was cooled to room temperature, and 200 ml of the reaction product and 700 ml of methanol were mixed in a shaker for about 10 minutes and centrifugation was conducted utilizing a centrifuge at about 18° C. and about 10,000 rpm for about 10 minutes. After the centrifugation, a polymer solution in which silica networked (e.g., bonded) with a silsesquioxane having a double bond at the terminal end thereof was finally obtained.

<Manufacture of Window Member>

A plastic substrate on which cleaned polycarbonate and polymethylmethacrylate (via a washing process) were laminated was coated with a hard coating composition including the polymer prepared by the above-described method. The hard coating composition further included a solvent, a urethane acrylate oligomer and a photoinitiator. The solvent utilized included propylene glycol monomethyl ether (PGME) and propylene glycol monomethyl ether acetate (PGMEA). A phenylglyoxylate-based photoinitiator was utilized as the photoinitiator.

The hard coating composition was supplied (e.g., coated) on a polymethylmethacrylate surface. The plastic substrate coated with the hard coating composition was heat treated at about 85° C. for about 4 minutes to volatilize (e.g., evaporate) the solvents. Ultraviolet rays were supplied, and heat treatment was conducted at about 85° C. to cure the hard coating composition to form a hard coating layer. The thickness of the hard coating layer was measured and was about 18 μm.

<Evaluation of Window Member According to an Embodiment>

With respect to the window member manufactured by the above-described method, the surface hardness of the window member, the bending properties and impact resistance of the window member were evaluated. In addition, the evaluation of the curl properties of the window member and standing test at a high temperature were performed to evaluate the reliability.

Table 1 lists the configuration of the window member of the Comparative Examples and an example (i.e., Example 1) utilized for the evaluation of the window member. Referring to Table 1, a substrate on which polycarbonate (PC) and polymethylmethacrylate (PMMA) were laminated was utilized as the plastic substrate in the window member of the Comparative Examples and Example 1. The column titled "configuration of a hard coating layer" shows the compounds utilized in a composition for forming a hard coating layer in the Comparative Examples and Example 1.

TABLE 1

| | Sample | | |
|---|---|---|---|
| | Plastic substrate | Configuration of hard coating layer | Thickness of hard coating layer (μm) |
| Comparative Example 1 | PC/PMMA | Cage-type silsesquioxane | 35 |
| Comparative Example 2 | PC/PMMA | Ladder-type silsesquioxane | 15 |
| Comparative Example 3 | PC/PMMA | Urethane acrylate/fluorene | 8 |
| Comparative Example 4 | PC/PMMA | Urethane acrylate/silica | 17 |
| Example 1 | PC/PMMA | Silsesquioxane/siloxane/silica/urethane acrylate | 18 |

Referring to Table 1, the configurations of the Comparative Examples and Example 1 are different. In Comparative Example 1, the hard coating layer was formed by including a cage-type silsesquioxane, and in Comparative Example 2, the hard coating layer was formed by including a ladder-type silsesquioxane. Comparative Example 3 corresponds to a case where an organic hard coating layer was included, and the hard coating layer was formed by including urethane acrylate and a fluorene compound. In addition, Comparative Example 4 corresponds to a case where an organic inorganic composite hard coating layer was included, and the hard coating layer was formed by including urethane acrylate and silica. In contrast, Example 1 corresponds to a case where a hard coating layer formed utilizing the hard coating composition according to an embodiment was included. Particularly, the hard coating layer according to an embodiment was formed utilizing a polymer derived from a mixture of a silsesquioxane, a siloxane compound, silica of which surface was treated with silane, and a polyfunctional urethane acrylate.

Table 2 shows the evaluation results of the window members of Example 1 and the Comparative Examples.

In Table 2, surface hardness was measured utilizing a pencil hardness gauge. Pencil hardness (H) was measured at a load of 1 kg utilizing the pencil hardness gauge.

The bending properties were evaluated by a Mandrel test method. The bending properties were evaluated by wrapping the specimen of a window member on which a hard coating layer was formed around a set of rods with decreasing diameters sequentially. The smallest diameter of the rod by which cracks were not generated in the hard coating layer was recorded to represent the bending property. The Mandrel test method is schematically illustrated in FIG. 8.

Figure 8:
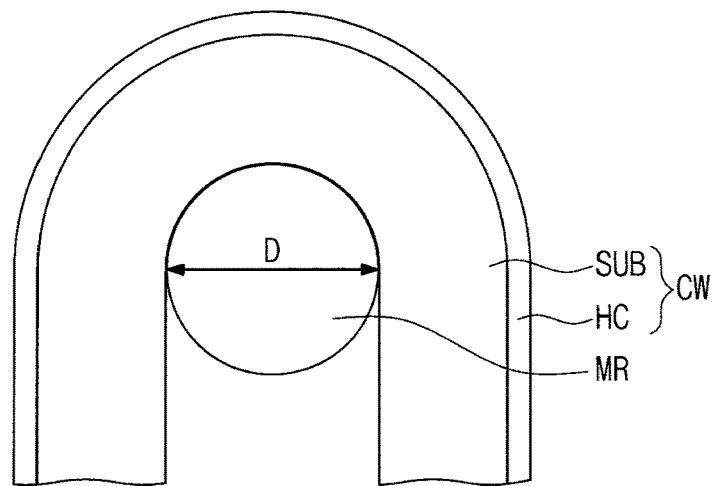
FIG. 8 schematically illustrates a method of evaluating the bending properties of a window member.

Referring to FIG. 8, the specimen of the window member was disposed to wrap around a rod for test (MR) so as to be bent in a direction of 180 degrees. In this case, the hard coating layer HC was disposed on a relatively outer zone to (i.e., further away from the rod than) the plastic substrate SUB. The diameter D of the rod for test MR was changed to smaller ones one by one, and the same specimen of the window member was tested. In Table 2, the minimum diameters D of the rod for test MR with which cracks were not generated in the hard coating layer HC are shown.

Impact resistance was evaluated by a ball drop test method. A steel ball having a constant weight was dropped on the hard coating layer, and the hard coating layer was evaluated for whether it was broken or not. The impact resistance in Table 2 is represented by the lowest height (cm) when the hard coating layer was broken due to the dropping of a steel ball with 130 g.

Figure 9:
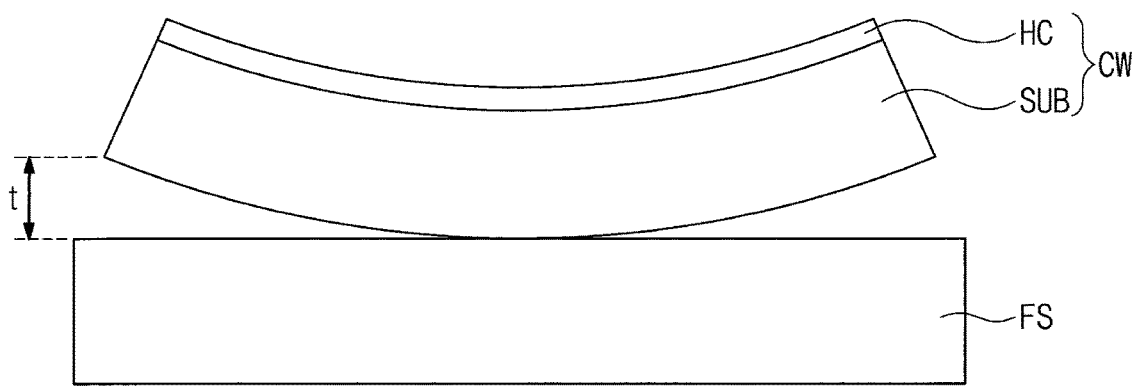
FIG. 9 schematically illustrates a method of evaluating the curling properties of a window member.

FIG. 9 is a diagram schematically illustrating a method of evaluating curling properties. On a substrate FS having a planar surface, a window member CW as a specimen for test was disposed, and the distance (e.g., the maximum distance) t of the window member CW from the upper surface of the substrate FS was measured. In this case, the specimen for test was disposed so that the hard coating layer HC faced upward.

The reliability at a high temperature was evaluated according to whether cracks were generated in the hard coating layer when the window member was maintained at a high temperature of about 85° C. The high temperature reliability in Table 2 was obtained according to whether cracks were generated after maintaining the specimens of the Comparative Examples and Example 1 at about 85° C. for about 72 hours or more.

TABLE 2

| | Sample | | | | |
|---|---|---|---|---|---|
| | Surface hardness (H) | Bending properties | Impact resistance (cm) | Curling properties (mm) | High temperature reliability |
| Comparative Example 1 | 4 | D80 | 30 | −1.0 | Obtained |
| Comparative Example 2 | 4 | D70 | 40 | 2.0 | None |
| Comparative Example 3 | 3 | D80 | 30 | 1.0 | None |
| Comparative Example 4 | 6 | D70 | 20 | 0.5 | Obtained |
| Example 1 | 7 | D60 | 120 | 0.3 | None |

Referring to the evaluation results of Table 2, the window member of Example 1 was found to have higher surface hardness and impact resistance when compared to those of the Comparative Examples. In addition, with respect to the bending properties, it can be observed that Example 1 has the smallest diameter in the Mandrel test, indicating that Example 1 has improved flexibility compared to that of the Comparative Examples.

From the evaluation results on the impact resistance of Table 2, the height of ball drop of Example 1 showed the greatest value, and it can be observed that the impact resistance was improved when compared to that of the Comparative Examples.

In the evaluation of the reliability, the curling degree of Comparative Examples 1 to 3 was high and at about 1.0 mm or higher, and distortion between the hard coating layer and the plastic substrate was severe. Here, the curling properties of Comparative Example 1 exhibited a negative value (−) and corresponded to a case where the curling has an opposite shape to that shown in FIG. 9. That is, the negative value corresponds to a case where the central part of the window member CW is distorted so as to be separated from the flat substrate FS. In Comparative Example 4 in which an organic and inorganic composite material was utilized in the hard coating layer, improved curl properties were shown when compared to that of Comparative Examples 1 to 3, but Example 1 shows the minimum degree of curling, and the curling properties of Example 1 were further improved when compared to those of Comparative Example 4.

With respect to the reliability at a high temperature for evaluating the generation of cracks when standing at (e.g., exposed to) a high temperature of about 85° C., cracks were not generated in Comparative Examples 2 and 3, and Example 1, and excellent reliability at a high temperature was attained for these examples.

Referring to the results in Table 2, in the window member according to an embodiment (including a hard coating layer formed utilizing a polymer derived from a mixture including a silsesquioxane, a siloxane compound, and silica surface treated with silane), stress was released by a silsesquioxane polymer, and the impact resistance was improved. In addition, by utilizing surface modified silica, the silica content was increased, and the surface hardness was improved, thereby attaining excellent surface hardness and flexibility at the same time.

The hard coating composition according to an embodiment includes a polymer including a silsesquioxane, a siloxane compound, and inorganic particles which are surface treated with silane, and may provide a hard coating layer having excellent surface hardness and flexibility.

According to an embodiment, a hard coating layer (formed from a polymer including a silsesquioxane, a siloxane compound, and inorganic particles which are surface treated with silane) is on a plastic substrate, and may provide a window member with excellent bending properties and reliability.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed, and equivalents thereof.

What is claimed is:

1. A hard coating composition comprising a polymer represented by the following Formula 1-1 and at least one photoinitiator,
    wherein the at least one photoinitiator comprises:
        a first photoinitiator configured to be activated by first ultraviolet rays; and
        a second photoinitiator configured to be activated by second ultraviolet rays, the second ultraviolet rays having a longer wavelength than the first ultraviolet rays,
    wherein the first photoinitiator and the second photoinitiator are comprised in a weight ratio of 1:0.2 to 0.2:1,

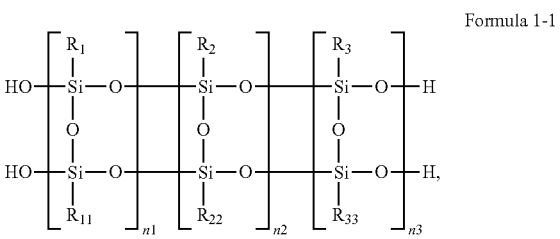

Formula 1-1 wherein in Formula 1-1, $R_1$ and $R_{11}$ are each independently a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO)\!-\!*$, X is a hydrogen atom, a deuterium atom, a halogen atom, a substituted or unsubstituted $C_{1-6}$ alkyl group, or a hydroxyl group;

M is Si, Al, Ti, Zn, or Zr;

a is 1, when M is Si or Ti, b is 3, when M is Zn, b is 1, when M is Al, b is 2, and when M is Zr, b is 1, 2 or 3;

$R_2$ and $R_{22}$ are each independently a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group;

$R_3$ and $R_{33}$ are each independently a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or $*\!-\!(CH_2)\!-\!{}_p{}^Y$;

p is an integer of 1 to 6, Y is

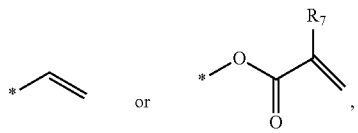

$R_7$ is a hydrogen atom or a methyl group; and n2, and n3 are each independently an integer of 1 to 100, n1 is an integer of 2 to 100, and at least one $R_1$ from n1 number of $R_1$ $((X)_b(M)_aO)\!-\!*$.

2. The hard coating composition of claim 1, wherein the at least one photoinitiator is comprised in an amount of 1 wt % to 5 wt % based on a total amount of the hard coating composition.

3. The hard coating composition of claim 1, further comprising a polyfunctional acrylate compound.

4. The hard coating composition of claim 3, wherein the polyfunctional acrylate compound is comprised in an amount of 3 wt % to 20 wt % based on a total amount of the hard coating composition.

5. The hard coating composition of claim 3, wherein the polyfunctional acrylate compound comprises at least six acrylate functional groups.

6. The hard coating composition of claim 1, further comprising at least one of a polyfunctional acrylate monomer or a polyfunctional urethane acrylate oligomer.

7. The hard coating composition of claim 1, further comprising at least one of an antistatic agent or an ultraviolet absorbent.

8. A hard coating composition comprising a polymer represented by the following Formula 1 and at least one photoinitiator:

Formula 1

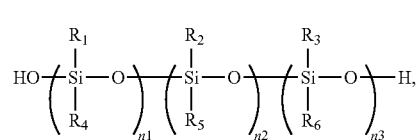

wherein in Formula 1, $R_1$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO)\!-\!*$, X is a hydrogen atom, a deuterium atom, a halogen atom, a substituted or unsubstituted $C_{1-6}$ alkyl group, or a hydroxyl group;

M is Si, Al, Ti, Zn, or Zr;

a is 1, when M is Si or Ti, b is 3, when M is Zn, b is 1, when M is Al, b is 2, and when M is Zr, b is 1, 2 or 3;

$R_2$ is a hydrogen atom, a deuterium atom, a halogen atom, substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, or a substituted or unsubstituted silyl group;

$R_3$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or $*\!-\!(CH_2)\!-\!{}_p{}^Y$;

p is an integer of 1 to 6, Y is

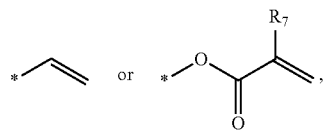

$R_7$ is a hydrogen atom or a methyl group;

$R_4$, $R_5$, and $R_6$ are each independently a hydrogen atom, a deuterium atom, a halogen atom, a substituted or unsubstituted alkyl group having 1 to 6 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or an oxygen atom which is connected with an other silicon atom of the polymer represented by Formula 1;

n2, and n3 are each independently an integer of 1 to 100, n1 is an integer of 2 to 100, and at least one $R_1$ from n1 number of $R_1$ is $((X)_b(M)_aO)\!-\!*$, wherein the at least one photoinitiator comprises:
a first photoinitiator configured to be activated by first ultraviolet rays; and
a second photoinitiator configured to be activated by second ultraviolet rays, the second ultraviolet rays having a longer wavelength than the first ultraviolet rays, and
wherein the first photoinitiator and the second photoinitiator are comprised in a weight ratio of 1:0.2 to 0.2:1.

9. The hard coating composition of claim 8, wherein X is a hydroxyl group, and M is Si.

10. The hard coating composition of claim 8, wherein Formula 1 is represented by the following Formula 1-1:

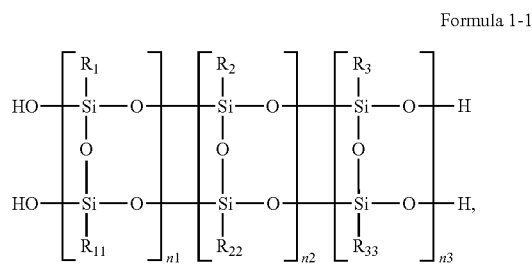

Formula 1-1 wherein in Formula 1-1,
$R_{11}$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO)$—*;

$R_{22}$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group;

$R_{33}$ is a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or *—$(CH_2)_P$—$^Y$; and in Formula 1-1, $R_1$, $R_2$, $R_3$, n1, n2, n3, X, M, a, b, Y, and P are a same as defined in Formula 1.

11. The hard coating composition of claim 8, further comprising a polyfunctional acrylate compound.

12. A window member comprising:
a plastic substrate; and
a hard coating layer on the plastic substrate,
wherein the hard coating layer is formed utilizing a polymer represented by the following Formula 1-1 and at least one photoinitiator, wherein the at least one photoinitiator comprises:
a first photoinitiator configured to be activated by first ultraviolet rays; and
a second photoinitiator configured to be activated by second ultraviolet rays, the second ultraviolet rays having a longer wavelength than the first ultraviolet rays,
wherein the first photoinitiator and the second photoinitiator are comprised in a weight ratio of 1:0.2 to 0.2:1,

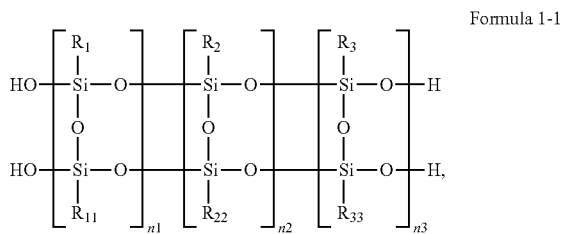

Formula 1-1 wherein in Formula 1-1,
$R_1$ and $R_{11}$ are each independently a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, a hydroxyl group, or $((X)_b(M)_aO)$—*, X is a hydrogen atom, a deuterium atom, a halogen atom, a substituted or unsubstituted $C_{1-6}$ alkyl group, or a hydroxyl group;

M is Si, Al, Ti, Zn, or Zr;

a is 1, when M is Si or Ti, b is 3, when M is Zn, b is 1, when M is Al, b is 2, and when M is Zr, b is 1, 2 or 3;

$R_2$ and $R_{22}$ are each independently a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group;

$R_3$ and $R_{33}$ are each independently a hydrogen atom, a deuterium atom, a halogen atom, a substituted or unsubstituted alkyl group having 1 to 6 carbon atoms, a substituted or unsubstituted alkenyl group having 2 to 20 carbon atoms, a substituted or unsubstituted aryl group having 6 to 30 carbon atoms for forming a ring, a substituted or unsubstituted heteroaryl group having 2 to 30 carbon atoms for forming a ring, a substituted or unsubstituted silyl group, or *—$(CH_2)_P$—$^Y$;

p is an integer of 1 to 6, Y is

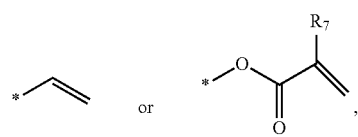

R₇ is a hydrogen atom or a methyl group; and
n2, and n3 are each independently an integer of 1 to 100, n1 is an integer of 2 to 100, and at least one $R_1$ from n1 number of $R_1$ is $((X)_b(M)_aO\!\!+\!)^*$.

13. The window member of claim 12, wherein the plastic substrate comprises:
    a first substrate comprising a first polymer resin; and
    a second substrate comprising a second polymer resin different from the first polymer resin.

14. The window member of claim 12, wherein the hard coating layer is disposed on an upper surface of the plastic substrate, and a protective coating layer disposed on a bottom surface of the plastic substrate is further comprised.

15. The hard coating composition of claim 1, wherein
    the first photoinitiator is selected from the group consisting of a-hydroxy ketone, 2,2-dimethoxy-1,2-diphenylethan-1-one, 2-hydroxyl-1-[4-(2-hydroxyethoxy)phenyl]-2-methyl-1-propanone, and 2-hydroxy-1-{4-[4-(2-hydroxy-2-methyl-1-propionyl)-benzyl]-phenyl}-2-methylpropan-1-one, and
    the second photoinitiator is selected from the group consisting of phenylglyoxylate, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl) carbazol-3-yl]ethylideneamino] acetate, and Bis(2,4-cyclopentadienyl)bis[2,6-difluoro-3-(1-pyrryl)phenyl] titanium(IV).

16. The window member of claim 12, wherein
    the first photoinitiator is selected from the group consisting of a-hydroxy ketone, 2,2-dimethoxy-1,2-diphenylethan-1-one, 2-hydroxyl-1-[4-(2-hydroxyethoxy)phenyl]-2-methyl-1-propanone, and 2-hydroxy-1-{4-[4-(2-hydroxy-2-methyl-1-propionyl)-benzyl]-phenyl}-2-methylpropan-1-one, and
    the second photoinitiator is selected from the group consisting of phenylglyoxylate, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl) carbazol-3-yl]ethylideneamino] acetate, and Bis(2,4-cyclopentadienyl)bis[2,6-difluoro-3-(1-pyrryl)phenyl] titanium(IV).

* * * * *